United States Patent
Howard, Jr. et al.

[11] Patent Number: 5,965,117
[45] Date of Patent: Oct. 12, 1999

[54] WATER-BOUYANT PARTICULATE MATERIALS CONTAINING MICRONUTRIENTS FOR PHYTOPLANKTON

[75] Inventors: Edward G. Howard, Jr., Hockessin; Thomas C. O'Brien, Wilmington, both of Del.

[73] Assignee: E.I. du Pont de Nemours and Company, Wilmington, Del.

[21] Appl. No.: 08/983,582

[22] PCT Filed: Jul. 18, 1996

[86] PCT No.: PCT/US96/11896

§ 371 Date: Jan. 22, 1998

§ 102(e) Date: Jan. 22, 1998

[87] PCT Pub. No.: WO97/04130

PCT Pub. Date: Feb. 6, 1997

Related U.S. Application Data

[60] Provisional application No. 60/001,615, Jul. 28, 1995, and provisional application No. 60/015,676, Apr. 17, 1996.

[51] Int. Cl.$^6$ .......................... A61K 31/74; A61K 33/34; C05B 7/00; A01B 79/00

[52] U.S. Cl. ..................... 424/78.26; 424/78.34; 424/631; 424/641; 424/646; 424/657; 71/31; 71/33; 71/36; 71/44; 71/51; 71/57; 71/59; 71/61; 47/58.1

[58] Field of Search .............................. 424/78.26, 78.34, 424/631, 641, 646, 657; 71/31, 33, 36, 44, 51, 57, 59, 61; 47/58.1

[56] References Cited

U.S. PATENT DOCUMENTS

| | | | |
|---|---|---|---|
| Re. 32,356 | 2/1987 | Cardarelli | 424/78 |
| 4,997,576 | 3/1991 | Heller et al. | 210/748 |

FOREIGN PATENT DOCUMENTS

| | | |
|---|---|---|
| 4-202025 | 7/1992 | Japan . |
| WO 91/04732 | 4/1991 | WIPO . |
| WO 96/22681 | 8/1996 | WIPO . |

OTHER PUBLICATIONS

A. J. Watson et al., *Nature*, 371, 143, 1994.
M. L. Wells et al., *Nature*, 353, 248, 1991.
K. S. Johnson et al., *Marine Chem.*, 46, 319, 1994.
J.H. Martin et al., *Deep–Sea Research*, 36(5), 649, 1989.
Jack McLachlan, *Canadian Journal of Microbiology*, 10, 769, 1964.
R. Rippka et al., *J. of General Microbiology*, 111, 1–61, 1979.
Kolber et al., *Nature*, 371, 145, 1994.
J.H. Martin et al., *Nature*, 371, 123, 1994.
K. Van Scoy et al., *New Scientist*, 32, 1994.

*Primary Examiner*—Ponnathapura Achutamurthy
*Assistant Examiner*—Tekchand Saidha

[57] ABSTRACT

Water-buoyant compositions comprising a source of micronutrients for photosynthetic phytoplankton growth are useful for stimulating photosynthetic phytoplankton growth in ocean areas devoid of such growth when deployed on ocean surfaces as floating particles. Iron is the preferred micronutrient.

28 Claims, No Drawings

WATER-BOUYANT PARTICULATE MATERIALS CONTAINING MICRONUTRIENTS FOR PHYTOPLANKTON

This application is the U.S. national stage of application PCT/US96/11896, filed Jul. 18, 1996, which claims the benefit of U.S. Provisional Application No. 60/001,615, filed Jul. 28, 1995 and U.S. Provisional Application No. 60/015,676, filed Apr. 17, 1996.

FIELD OF THE INVENTION

This invention relates to micronutrient-source-containing materials in the form of buoyant particles. The invention also relates to the preparation of such materials and to their use to stimulate photosynthetic phytoplankton growth in micronutrient-deficient areas of the oceans or other bodies of water.

TECHNICAL BACKGROUND

Iron is known to be an essential micronutrient for the photosynthetic growth of phytoplankton (algae) in global waters, particularly oceans. More than one-fifth of the world's oceans have iron-deficient surface waters with little or no algae growth despite the presence of all other essential growth nutrients (Kolber et al. Nature 371, 145 (1994)). These regions have been referred to as high-nitrate, low-chlorophyl (HNLC) areas. Martin and others have suggested adding iron to the ecosystems of these oceanic areas to encourage phytoplankton growth on a scale sufficient to affect the level of atmospheric carbon dioxide, which in turn might be of use to help prevent global warming. See, for example, Martin, J. H. et al. Nature 371, 123 (1994).

A major "iron-seeding" experiment performed in 1993 in an area of the equatorial Pacific Ocean currently devoid of algae showed that the addition of iron produced an immediate and dramatic growth of phytoplankton. The effect, however, was short-lived. A major reason was rapid loss of iron. Iron loss was attributed to iron sinking into deeper waters and/or possible adsorption of iron by organic material (Van Scoy, K. et al. New Scientist, p. 32 (Dec. 3, 1994), Martin, J. H. et al. Nature 371, 123 (1994)). Little effect on surface carbon dioxide concentrations was detected, presumably because of the short-lived nature of the experiment (Watson, A. J. et al. Nature, 371, 143 (1994)).

Wells, M. L. et al., in Nature, 353, 248 (1991), disclose that iron availability as a micronutrient for algae growth depends on its chemical liability and/or ease of dissolution. Natural sources of iron are often in an unconfined refractory particulate or colloidal form, unavailable for direct assimilation by phytoplankton. Such forms are eventually converted by natural means into bioavailable forms, but at a slow and unpredictable rate. Time-consuming chemical reactions must occur before this iron is "bioavailable", i.e., converted to a form which can be utilized in photosynthesis. Much "natural" iron is lost by sedimentation or other means before such conversion is complete. Johnson, K. S. et al., in Marine Chem. 46, 319 (1994), disclose that iron in particles or colloids must be at least partly solubilized for bioavailability to support phytoplankton growth. Experiments wherein iron addition led to rapid, albeit temporary, algae growth have employed soluble ferrous or ferric salts such as ferrous sulfate dissolved in acidified seawater (Van Scoy et al., supra).

Although the prior art has shown the positive impact on photosynthetic growth of adding nutrients such as iron, nutrient sources were supplied in a non-buoyant form. Non-buoyant sources quickly sank and disappeared from the growth sites, after which photosynthesis declined rapidly. Alternately, in order to mimic the major source of natural iron to remote areas of the world's oceans, atmospheric dust particles were added as aerosols. Such particulate sources of iron, even though mostly refractory (non-lablile) iron, contributed to photosynthetic phytoplankton growth, as measured by chlorophyl production. See K. S. Johnson et al., supra. It was found that photochemical reduction contributed to the bioavailablity of the particulate iron.

It is the purpose of the present invention to artificially provide micronutrients to phytoplankton on a more continuous or sustained basis. Floating or water-buoyant compositions containing photosynthetic growth micronutrients such as iron will remain longer in surface waters, and thus can increase the availability of nutrient iron for photosynthetic processes. Floating materials containing a source of one or more elemental nutrients, especially iron, on or near the surface of bodies of water deficient in such elemental micronutrients, will stimulate and maintain effective photosynthetic phytoplankton growth for a sustained period of time.

SUMMARY OF THE INVENTION

The present invention provides a water-buoyant composition which provides a sustained source of micronutrient for photosynthetic phytoplankton growth. Such a composition may further comprise a water-buoyant, chemically-inert, relatively water-insoluble particulate substrate to support the micronutrient source.

The present water-buoyant, micronutrient-source-containing compositions or materials may suitably be in the form of an aqueous dispersion, in the form of dry, free-flowing particles, or an equivalent form. The compositions may, optionally, further comprise water-soluble agents that temporarily seal the micronutrient source in particles and/or provide slow release of the micronutrient source from the supporting substrate into the surrounding body of water.

The invention also provides a process for preparing water-buoyant micronutrient source-containing compositions, said process comprising admixing and impregnating a substrate material, comprising water-buoyant, chemically-inert, relatively water-insoluble particles, with an aqueous solution or dispersion of one or more compounds that are a source of at least one photosynthetic phytoplankton micronutrient.

The invention also provides a process for increasing oceanic plankton biomass and/or decreasing atmospheric carbon dioxide, by applying micronutrient-source-containing compositions to bodies of fresh or salt water, for example lakes, bays, gulfs, or oceans. In the case of very large areas of oceans, for example, in the equatorial Pacific, the North Atlantic, or the Arctic or Antarctic regions, the effect on reducing atmospheric carbon dioxide may be significant. The invention, therefore, may provide a way to combat the rise of anthropogenic carbon dioxide in the atmosphere, which otherwise might contribute to global warming, just as in the past, a decrease in atmospheric carbon dioxide led to the onset of ice ages.

The particulate material according to the present invention may be applied to the surface of a body of water as a liquid dispersion, or the material may be first dried and applied to said body of water as free-flowing particles. Optionally, one or more water-soluble agents that temporarily seal micronutrient source compounds and/or promote their durable adhesion to the substrate or their slow release into the ocean, may be added to a micronutrient-containing solution or dispersion prior to admixed with a substrate. Alternatively, such agents may be applied to the particulate product after drying.

A further objective of this invention is to provide water-buoyant, micronutrient-source-containing compositions comprised of low-cost, abundant materials that will have no negative environmental impact in the proposed use.

A still further objective of the invention is to stimulate plankton growth in bodies of water, to increase its biomass for environmental reasons and/or to increase its harvest of marine or fresh-water food for human consumption.

A still further objective of the invention is to stimulate photosynthetic growth on a sufficiently large scale to cause a global reduction in atmospheric carbon dioxide.

DETAILS OF THE INVENTION

The present invention provides a source of micronutrients for photosynthetic growth. The micronutrient source is contained in a water-buoyant material that permits the micronutrients to be more gradually and fully utilized in photosynthesis.

More specifically, the invention provides a water-buoyant, artificially-made composition comprising a source of micronutrient for photosynthetic phytoplankton growth. Preferably, the composition further comprises a water-buoyant, chemically-inert, relatively water-insoluble, attrition-resistant particulate substrate to support the micronutrient source. The micronutrient source is a compound or mixture of compounds that is in a form which is either bioavailable or that readily becomes bioavailable under environmental conditions prevailing in use. The principal purpose of the buoyant compositions of the invention is to facilitate an efficient and continuing supply of a source of photosynthetic micronutrient in the vicinity of the air/water interface of a body of water. The emphasis of the present invention is on iron (Fe) as the micronutrient, for which a clear need exists in major parts of the world's oceans. Nevertheless, it will be understood that other sources of essential elemental nutrients such as cobalt, manganese and zinc (Martin et al. *Deep Sea Res.*, 36, 666–667 (1989)) could be similarly entrained, alone or in combination with other micronutrients, in water-buoyant compositions.

By "water buoyant" is meant the ability to float on water for a substantial period of time. Such materials will normally have a density of less than 1000 $kg/m^3$ in the case of fresh water and a density of less than 1030 $kg/m^3$ in the case of sea water.

By the term "micronutrient" or "elemental micronutrient" is meant an element that is essential in trace amounts for phytoplankton growth. For example, iron (Fe) plays a crucial role in the bioenergetics of carbon and nitrogen metabolism and is required for the synthesis of chlorophyl and the reduction of nitrate. Other micronutrients include Co, Mn, and Zn. For example, cobalt is required for synthesis of vitamin $B_{12}$ and manganese is essential for enzyme activation. The preferred nutrient, however, is iron, either alone or in combination with other micronutrients. In the case of relatively smaller bodies of waters, such as lakes and bays, it may also be desirable to include phytoplankton nutrients such as phosphates or nitrates in the materials or compositions of the present invention.

By "micronutrient source" is meant one or more metals of compounds thereof which provide one or more essential elemental micronutrients for photosynthetic growth, either in a bioavailable form or in a form that is convertible to a bioavailable form during use.

By "bioavailable" is meant in a form that is utilizable in the photosynthetic growth process by phytoplankton.

By the term "relatively insoluble," in reference to a substrate, is meant that the substrate remains mostly insoluble during the time it releases its micronutrients. The substrate may eventually decompose and/or dissolve over a longer period of time, for example, as a result of exposure to sun and chemicals which are naturally occurring.

By the term "substrate" is meant the buoyant material of which the claimed composition is made in the absence of the source of micronutrient.

The present water-buoyant compositions may be prepared in various ways, several of which will be evident to those skilled in the art in view of the examples presented herein. Applicant emphasizes that the following process details and examples are intended to be illustrative only and not limiting of the scope of the invention.

The preferred procedure for preparing the present materials is by admixing a water-buoyant, chemically-inert, relatively water-insoluble particulate substrate material with an aqueous solution or dispersion of one or more compounds that are a source of at least one micronutrient for photosynthetic growth, in order to provide an aqueous dispersion of particles, wherein a micronutrient source is supported on the substrate of the water-buoyant particles.

The aqueous dispersion of particles of the invention may be applied "as-is" to the surface of a body of water, or they may be dried and applied to water as free-flowing particles. Optionally, one or more water-soluble agents that seal micronutrient-source compounds and/or promote durable adhesion of micronutrient-source compounds to the substrate and/or cause slow release of the micronutrient-source compounds may be added to the micronutrient-source-containing solution or dispersion prior to admixture with a substrate, or may be applied to the particulate product after drying.

Preferred water-buoyant, water-insoluble substrates are low-cost, abundant, chemically-inert materials such as finely divided polymeric foam materials, fly ash (from coal burning electric utilities) and materials derived therefrom, hollow glass particles, cellulosic materials from plants, or other low-cost sources of water-buoyant particles. By the term "glass" is meant an amorphous, rigid, inorganic solid, which may or may not be translucent. It would be desirable to produce commercial quantities of the product according to the present invention in commercial lots or quantities of at least one metric ton. For regulating oceanic areas, the total amount of material used would, of course, be very large and provide bioavailable iron for an area of many square miles. The particles according to the invention can be dispersed onto a body of water, for example, by releasing or blowing them from a barge or cargo plane.

J. H. Martin has estimated, *Discover*, p. 55–61 (April 1991), that if about 300,000 metric tons ($3 \times 10^8$ kg) of iron were broadcast on the ocean surrounding Antarctica over a 6-month growing season, resultant phytoplankton would convert 2'1012 kg of carbon derived from about $7.4 \times 10^{12}$ kg of atmospheric carbon dioxide into new organic matter. This is about a third of the volume of $CO_2$ generated annually from all worldwide automotive and powerplant sources. Thus, by means of the present invention, it is possible to significantly ameliorate, if not completely cancel, current levels of carbon dioxide introduced by man into the atmosphere.

Suitable water-buoyant polymeric foam materials include, but are not limited to, foams made from polystyrene, polyurethane, polyester, polyvinyl alcohol, urea/formaldehyde, poly(lactides) and the like. These foam materials should be finely divided for increased surface area and more rapid subsequent degradation in use.

A preferred micronutrient, as indicated above, is iron. Suitable sources of iron include, but are not limited to, low-cost, abundant ferrous or ferric compounds such as elemental iron, ferrous sulfate, ferrous ammonium sulfate, ferric sulfate, ferrous chloride, ferric chloride, ferric nitrate, ferrous nitrate,oxides of iron, hyrdroxides of iron, iron suboxides such as oxychlorides, and mixed metal oxides containing iron such as iron phosphates, silicates, aluminates, aluminosilicates, and titanates. Iron in the form of Fe (II) and in particular Fe (III) hydroxy species is preferred.

Suitable water-soluble agents for improving adhesion of the nutrient compounds to the water-buoyant substrates include, but are not limited to, organic water soluble polymers such as poly(vinyl alcohol), poly(acrylic acid), poly(methacrylic acid), methyl cellulose, hydroxymethyl cellulose, poly(N-vinyl pyrrolidones), poly(acryl amide), poly(methacryl amide), poly(ethylene oxide), gelatin, natural gums; and inorganic water soluble polymers such as sodium poly(silicates). Natural gums include mucilaginous gums derived from guar, agar agar, locust bean and carrageenin.

An aqueous dispersion of micronutrient-source-containing particles may be dried, preferably in air, at elevated temperatures, for example, between about 20° and 130° C. or higher.

It will be recognized that, in the practice of the present process, components of the water-buoyant compositions may be added in different orders. Optionally, a water-soluble adhesion promoter may be added to the water-buoyant substrate before, during, or after admixture with one or more micronutrient-source compounds. Applicant has found, however, that impregnation of buoyant substrates with micronutrient-source compounds occurs more efficiently when materials are added in the order described herein. As shown in Example 3 below, for example, more iron was adhered to the substrate when the substrate and micronutrient solution were thoroughly admixed before addition of an adhesion promoter than when the micronutrient solution was added after admixture of substrate and adhesion promoter. Processes involving an alternative order of addition, while less preferred, nevertheless fall within the scope of this invention.

In a preferred embodiment of the process for preparing material according to the present invention, the substrate is admixed and impregnated with a solution of micronutrient-source compounds, followed by the addition of an aqueous solution of base such as sodium hydroxide or, preferably, sodium polysilicate, which precipitates the iron on or within the substrate. This procedure increases the amount of iron compounds durably adhering to and supported on the substrate. Water soluble adhesion promoters may also be included in the base solution Sodium polysilicates are preferred because they serve both as a base and as an adhesion promoter. It is noted that freshly prepared iron-containing compositions may darken in color due to oxidative processes, particularly when ferrous compounds are employed. Such oxidative processes, however, do not adversely affect the effectiveness of the invention.

The particles according to the present invention suitably have an average longest dimension in the range of about 0.001 mm to 100 mm, provided that when the average longest dimension is greater than 10 mm, the average largest cross-sectional dimension perpendicular to the length cannot be more than 10% of the average longest dimension. (Tis proviso is equivalent to stating that the the average aspect ratio must be greater than 10, wherein the aspect ratio is defined as the length, i.e., the longest dimension, divided by the largest cross-sectional dimension perpendicular to the length.) The proviso is directed to particles when in the shape of fibers, including ribbon and threadlike shapes. Suitable fiber materials would include, for example, grass or excluded polymers.

The particles, in one embodiment of the invention, have an average longest dimension in the range of about 0.001 mm (1 micrometer) to 10 mm, preferably about 0.1 to 5 mm. Such particles, including powders, may have various shapes, for example, spherical, spheroid, pancake, rectangular, square, cylindrical, conical, or irregular shapes.

Lower or upper limits for the concentration of micronutrients in compositions according to the invention may vary depending on the particular body of water, the time of the year, and the desired result. It will be understood that micronutrient requirements for photosynthesis are extremely small. The compositions will normally comprise at least about 0.01% by weight of elemental micronutrient, preferably at least about 1%, most preferably at least about 10%. A practical upper limit may be as high as about 90% by weight.

Only nanomolar ($10^{-9}$ M) levels of bioavailable iron need be supplied, for example, in equatorial Pacific HNLC regions. It has been estimated (K. S. Johnson et al. *Marine Chemistry* 46, 319, 331 (1994)) that the biological requirements for iron in equatorial Pacific, based on various factors, including the Fe:C ratio of oceanic plankton, is 0.2 pmol Fe $1^{-1}$ $h^{-1}$. A supply rate of 0.01 pmol Fe $1^{-1}$ $h^{-1}$ would, therefore, probably be insufficient for desired or optimum growth, while a supply rate of 25 pmol $1^{-1}h^{-1}$ or more in the upper 10 m of equatorial Pacific ocean would probably be well in excess of biological requirements. Minimal and optimal requirements may differ in other areas, for example, the Antarctic. In any case, particulate compositions of the present invention may typically supply, over an extended period of use, bioavailable iron well in excess of biological growth requirements over the targeted area. A relatively large area of ocean can be practically supplied with sufficient micronutrient by means of the present invention.

The micronutrient source is released over a sustained period of time, in order to provide the biological growth requirement, on average, for at least one week, more preferably at least 1 month, and most preferably several months up to about a year or more.

The use of a water-buoyant substrate is preferred. It has also been found, however, that micronutrient-source compounds, for example, iron compounds, may be converted into water-buoyant particles without employing a separate water-buoyant substrate (see Examples 1A, 6). For example, one or more particulate iron compounds may be admixed and coated or encapsulated with a sealant such as aqueous sodium polysilicate solution (or a mixture of polysilicate or basic hydroxide or carbonate with a water soluble polymer), followed by drying. An exemplary hydroxide is sodium hydroxide. Exemplary carbonates include sodium carbonate or calcium carbonate. Alternatively (as in Example 6), an aqueous nature of iron compounds and polysilicate, optionally also containing an alkali carbonate, alkaline earth carbonate, or alkali bicarbonate, after drying to remove most of the water, can be converted to buoyant particles by heating at a high temperature (for example, with a Mekker burner).

The composition of the present invention is useful in promoting the photosynthetic growth of a wide variety of phytoplankton, including, but not limited to, diatoms, coccolithophorids, choanoflagellates, pico-eukaryotes, cyanobacteria, prochlorophytes, and autotropic dinoflagellates, for example, Synechocystis, *Dunaliella tertiolecta,* Synechococcus, *Shperocalyptra papillifera, Emiliana huxleyi,* Nitzschia sp., *Chaetoceros atlanticus, Meringosphaera mediterranea,* to name just a few. Increasing the growth of phytoplankton can, in turn, contribute to the growth of other biomass along the food chain. For example, phytoplankton support vast herds of krill and other sea creatures that are food for assorted fish, as well as seals, penguins, and whales.

The following examples are illustrative of the invention, but are by no means limiting thereof. Data presented in Tables 1 and 2 hereinbelow show that the water buoyant, micronutrient bearing, particulate compositions of the invention are effective stimulants for photosynthetic phytoplankton growth in both freshwater and marine water environments over periods of days, and that the compositions have no detrimental effect on growth in normal, iron-containing media.

General Procedure for Testing the Efficacy of Buoyant, Iron-containing Compositions as Micronutrient Sources The freshwater cyanobacteriurn, Synechocystls PCC6803 (from the cyanobacterium culture collection of the Institut Pasteur, Paris, France), and the green marine (seawater) alga *Dunaliella tertlolecta* were grown on their respective growth media BG-11 and artificial sea water (ASW), described hereinbelow, except that both media were devoid of iron. The cultures were serially diluted until they were clearly growing more slowly than counterparts in normal BG-11 and ASW growth media containing nutrient iron. The iron-starved cells were then used to inoculate both iron-depleted and normal, iron-containing media, as described below. Both sets of inoculated media were then exposed to the water-buoyant, iron-impregnated compositions of the invention, and studied in comparison with controls which were not exposed to said compositions.

Various compositions of the invention were placed in tubes (100 mm×11.5 mm int.dia.) at a weight in the range of 0.1–1.0 mg and inoculated with iron-starved or normal, iron-nurtured cultures, prepared as described above, to a total volume of 2.5 ml. The tubes were glass (Synechocystis) or plastic (Dunaliella). The cells were grown by placing the tubes on a spinning wheel to permit mixing and aeration of the cultures, and uniformly illuminated by fluorescent light at 10–20 w/nZ. The tubes were maintained at 30° C. and growth rates were followed by measurement of optical density at 730 nm.

Liquid BG-11 An enriched fresh water growth medium prepared according to R. Rippka et al. J. Gen. Microbiol., 111, 1 (1979):

1 M N-Tris(hydroxymethyl)methyl-2-aminoethane sulfonic acid-KOH, pH 8.2, 5ml;
BG-FPC*, 10 ml;
ferric ammonium citrate, 6 mg (deleted from iron-deficient media);
sodium carbonate, 20 mg;
potassium monohydrogen phosphate, 30.5 mg;
water, to a total of 1 L.
Autoclave for 45 min; a precipitate forms which is resuspended by shaking. When a nutrient supplement is required, 5 ml/L of 1 M glucose solution is added.

*BG-FPC:
$NaNO_3$, 149.58 g/l;
$MgSO_4.7H_2O$, 7.49 g/l;
$CaCl_2.2H_2O$, 3.60g/l;
Citric Acid, 0.60 g/l;
NaEDTA pH 8.0, 0.25 M, 1.12 ml;
or
EDTA pH 7.5, 0.2 M, 1.40 ml;
Trace Minerals (clear)**, 100 ml;
$H_2O$, to 1 liter;
**Trace Minerals:
$H_3BO_3$, 2.8 g/l;
$MnCl_2.4H_2O$, 1.81 g/l;
$ZnSO_4.7H_2O$, 0.222 g/l;
$Na_2MoO_4.2H_2O$, 0.390 g/l;
$CuSO_4.5H_2O$, 0.079 g/l;
$Co(NO_3)_2.6H_2O$, 0.0494 g/l;
$H_2O$, to 1 liter.

Artificial Seawater. The following artificial seawater composition (ASW) was prepared according to Goldman et al., Limnol. & Oceanogr., 23, 695 (1978); McLachlan, Can J. Microbiol., 10, 769 (1964)
NaCl, 23.4g;
$MgSO_4.7H_2O$, 4.9 g;
$CaCl_2.2H_2O$, 1.11 g;
KBr, 0.2 g;
KCl, 0.75;
$MgCl_2.6H_2O$, 4.1 g;
$H_3BO_3$, 0.0124 g;
$NaNO_3$, 0.075 g;
Vitamin mix*, 4 ml of secondary stock
Tris-(hydroxymethyl)aminomethane, 1 ml of stock solution**
Trace metals*** (no iron), 1 ml of stock solution
$NaH_2PO_4.H_2O$, 5 g
Selenious acid, 1 ml of 10 µM solution
Distilled water to 1 liter
*Vitamin mix:
Primary stock:
Biotin (dissolved in 1 drop/ng of 0.1 N NaOH), 10 mg in 10 ml dist. water
$B_{12}$, 10 mg in 10 ml dist. water
Secondary stock:
1 ml each of the biotin and $B_{12}$ primary stocks
900 ml of distilled water
Thiamine HCl, 200 mg
Distilled water to 1 liter
**Tris-(hydroxymethyl)aminomethane stock solution:
Tris-(hydroxymethyl)aminomethane, 50 g;
10 M HCl, 20–30 ml;
adjust pH to 7.1–7.3
Distilled water to 200 ml
***Trace metals:
$CuSO_4.5H_2O$, 980 mg
$ZnSO_4.7H_2O$, 2.2 g
$CoCl_2.6H_2O$, 1.0 g
$MnCl_2.4H_2O$, 18.0 g
$Na_2MoO_4.2H_2O$, 630 mg
Distilled water to 100 ml For artificial seawater containing iron, 4 ml of a stock solution containing 0.186 g of $Na_2EDTA$ and 0.135 g of $FeCl_3.6H_2O$ per liter were included in the artficial seawater composition.

In the examples, percentages are by weight and temperatures are in degrees Celsius unless otherwise indicated.

EXAMPLE 1

1A. A solution of 5 g of ferrous chloride ($FeCl_2.4H_2O$) in 25 ml of water containing 2.5 g of Elvanol® 50-42 poly (vinyl alcohol) from DuPont was added to a solution of 10 g of sodium polysilicate ($Na_2O.2.6SiO_2$; 14% NaOH, 27%$SiO_2$) in 20 ml of water. A dark green precipitate was obtained which slowly turned black by oxidation. After 5 hours, a few particles of the precipitate were dried. When the dried particles were reintroduced into water, they floated, and the particles remained intact after floating in quiet water for over one month. This experiment shows that a separate buoyant substrate is not essential. However, the yield of buoyant particles in which the micronutrient source is originally incorporated into the substrate is small compared to the amounts of particulate substrates that are separately available for use in the present invention.

1B. Example 1A was repeated except that 0.4 g of hollow glass particles (ECCO® spheres; Emerson & Cumming, Inc., Type TF-15) were placed in the initial ferrous chloride/poly(vinyl alcohol) solution. After addition of the sodium polysilicate solution, as above, a similar precipitate was obtained, much of it adhering to the floating glass particles. After drying, the dark-colored coated particles floated on water and retained integrity after at least one month on water.

When Example 1B was repeated except that the poly (vinyl alcohol) was eliminated, the oxidized, dried particles remained buoyant but slowly disintegrated in water.

EXAMPLE 2

2A. Five ml of a solution consisting of 15 g of $FeSO_4.7H_2O$ and 75 ml of 2 weight % aqueous poly(acrylic acid) (mol.wt. 2,000,000) in 75 ml of water were vigorously mixed with a suspension of 5 ml of ECCO® hollow glass particles in 20 ml of 20% aqueous sodium polysilicate ($Na_2O.2.6\ SiO_2$; 14% NaOH, 27% $SiO_2$). Iron-containing compounds precipitated, and much of it adhered to the glass particles. The precipitate was initially dark green, slowly turning black due to oxidation. After standing 5 min, the mixture was diluted to 118 ml in a round bottle. Essentially all the solids floated; only a trace of solids settled. The bottle was placed on rotating rolls and rolled at 2 rev/sec for 30 hours. The highly colored iron compounds remained floating even after 1 week of rolling, with only a trace of sediment.

2B. Example 2A was repeated except that the poly(acrylic acid) solution was replaced with a 1 weight % aqueous solution of methyl cellulose. A very finely divided precipitate was obtained which largely adhered to the floating glass particles. However, when the mixture was rolled for 30 hours as described in Example 2A, the insoluble iron compounds were released from the buoyant glass particles and settled to the bottom of the bottle. This illustrates controllable detachment of iron compounds from the buoyant glass particles.

2C. When either the poly(acrylic acid) of Example 2A or the methyl cellulose of Example 2B was omitted, most of the iron-containing solids settled to the bottom of the bottle. The glass particles were stained yellow-green in color, indicating that some of the iron compounds were still adhered thereto.

2D. Example 2A was repeated except that the poly(acrylic acid) was replaced with a 10 weight % aqueous solution of Elvanol® 50-42 poly(vinyl alcohol) and the hollow glass particles were added directly (without sodium polysilicate solution) to the ferrous sulfate/poly(vinyl alcohol) mixture. Iron compounds precipitated, and much of the precipitate remaining adhered to the glass particles. After shaking, a 20% sodium polysilicate solution was added. Most of the iron compounds remained attached to the floating particles, but a significant amount of non-buoyant iron-containing material was present as sediment. After rolling in water in a round bottle for one day, followed by standing for one month, approximately the same amount of iron-containing material remained attached to the floating particles.

EXAMPLE 3

This example illustrates how the order in which ingredients are mixed affects the buoyancy of precipitated iron-containing compounds.

3A. A suspension of 10 ml of hollow glass particles (PQ Extendospheres®, from fly ash) in 20 ml of water and 5 ml of 0.84 M aqueous ferric chloride was shaken in a round bottle and aged for 5 min. Then 3 ml of sodium polysilicate solution ($Na_2O.2.6\ SiO_2$; 14% NaOH, 27% $SiO_2$) were added, and the mixture was shaken and diluted to 100 ml with water. After one hour, all solids were floating, the precipitated iron compounds remaining attached to the buoyant glass spheres.

3B. A suspension of 10 ml of hollow glass particles (PQ Extendospheres®) in 20 ml of water and 3 ml of sodium polysilicate solution ($Na_2O.2.6\ SiO_2$; 14% NaOH, 27% $SiO_2$) was shaken in a round bottle and aged for 5 min. Five ml of 0.84 M aqueous ferric chloride solution were then added and the mixture was shaken and diluted to 100 ml with water. After one hour, a large portion of the precipitated iron-containing compounds sediment to the bottom. The floating hollow particles were mostly free of iron compounds.

The same results were obtained when ECCO® spheres were substituted for Extendospheres® particles.

EXAMPLE 4

This example illustrates the use of a polymeric foam to render iron compounds buoyant. Since the polymer is designed to oxidatively degrade when exposed to sunlight and air; the degradation rate will be increased by using smaller, higher surface area foam particles.

Polystyrene foam packing material (peanut shaped) was reduced to a particle size of about 1–5 nm in a food blendor. The particles were initially water repellant but were wetted when shaken with water. They remained water-buoyant and insoluble.

4A. Polystyrene foam particles, prepared as above, were stirred with a solution of 10% ferric chloride in water until the particles were coated with the solution. After drying at 90° C. in air, the coated particles were dark brown in color and floated. Soluble iron salts were slowly released from the floating foam particles. The brown color is believed due to the formation of ferric oxychlorides, some of which are partly soluble, and gradual hydrolysis of the oxychlorides to insoluble ferric oxide. Long-term photooxidative degradation of the polymer and gradual release of iron oxides is expected to occur on water surfaces.

4B. The experiment of 4A was repeated except that the iron-coated polystyrene particles were treated with 5% aqueous sodium hydroxide after drying to convert ferric oxychlorides rapidly to ferric oxide with increasing dark brown coloration. The particles were buoyant, apart from a small amount of brown ferric oxide sediment.

4C. Experiment 4B was repeated except that the sodium hydroxide was replaced with sodium polysilicate ($Na2O.2.6\ SiO_2$; 14% NaOH, 27% $SiO_2$). The floating foam particles became dark brown and a minor amount of iron and silica sediment was present.

4D. Experiment 4A was repeated except that the polystyrene was replaced with PQ Extendospheres® particles (hollow glass particles). A just sufficient amount of 10% aqueous ferric chloride solution was used to wet the particles, which were then dried at 110° C. Some of the (iron chloride)-coated particles fused but were easily separated by mild rubbing. The coated particles floated on water and retained most of their coating; and only a trace of iron precipitated.

When treated with sodium hydroxide as in Experiment 4B, the spheres remained coated with precipitated iron compounds, but the amount of unattached, precipitated iron sediment increased. A similar result was obtained using sodium polysilicate instead of sodium hydroxide.

EXAMPLE 5

In this example, polystyrene foam particles had their pores filled with powdered ferric oxide and, except in Experiment 5A, coated with an adhesion promoter.

5A. Ten ml of water, 0.2 g of powdered polystyrene foam and 1 g of ferric oxide powder were mixed and the excess water removed. The mixture was dried at 60° C. Some of the dried mixture was remixed with water and shaken. Much of the red ferric oxide settled as sediment, but the floating, porous polymer particles, red in color, retained a substantial amount of the ferric oxide.

5B. Experiment 5A was repeated except that the initial water also contained 1 g of sodium polysilicate (14% NaOH, 27% $SiO_2$; $Na_2O$. $2.6SiO_2$) solution. Part of the red ferric oxide sedimented out, part was attached to the polystyrene foam particles as in 5A, but, in this case, some ferric oxide was also dispersed in the liquid phase.

5C. Experiment 5B was repeated except that the sodium polysilicate was replaced with poly(vinyl alcohol) (5 ml of water, 5 ml of 5% Elvanol® 50-42). Results were similar to Experiment 4B; in that ferric oxide was present on the foam particles, dispersed in the liquid, and in sediment.

5D. Experiment 5B was repeated except that poly(vinyl alcohol) was also added (5 ml of water, 5 ml of 5% Elvanol® 5042) as well as sodium polysilicate. Results were very similar to those of Experiment 5C.

5E. Floating material from each of the above experiments was placed in individual round bottles and water was added. The four bottles were then placed on rollers and rotated for 22 hours. After rotation, the foam particles in each bottle had partially disintegrated and had released some ferric oxide which had dispersed in the aqueous phase. There was no further change after standing one month.

EXAMPLE 6

In this example, a solid mixture of sodium polysilicate and ferric oxide was converted into a particulate, buoyant, low density glass composition.

Twenty g of ferric oxide powder (red, anhydrous, from Fischer Scientific) and 150 g of sodium silicate (Aldrich; $Na_2O.2.6SiO_2$, in water) were mixed in a food blendor until a uniform dispersion was obtained. The dispersion was poured into a crystallizing dish and dried in an oven at 120° C. During drying, a tough, rubbery siliceous skin initially formed around each particle; the particles then converted gradually into hard, dark-red glassy particles. When a portion was heated with a Mekker burner, small particles melted and formed fragile, hollow, low density particles which floated on water and slowly released ferric oxide particles. After standing one week in the presence of water without agitation, many iron-containing particles remained floating, some iron oxide had sedimented, and other iron-containing material was dispersed in the water, as though saponified.

Heating the dried mixture in a hotter, propane/oxygen flame caused more fusing and eventual loss of the hollow particles; and some reduction of ferric oxide was also observed.

EXAMPLE 7

In this Example, a buoyant polyurethane foam was used to make a particulate, buoyant, low density composition containing ferric oxide. Ferric oxide (2 g) was ground to a uniform suspension in 2 ml (2.55 g) of the glycerine/resin used to make INSTAPAK™ polyurethane foam commonly used in packaging for shipping fragile items. This uniform suspension was quickly mixed for 40 seconds at room temperature with 2 ml (2.44 g) of the polymeric isocyanate (diphenylmethyl-isocyanate) used in the INSTAPAK™ system. The mixture formed a brittle red porous structure.

7A. In Test A, an approximately 1 cm cube size piece of the ferric oxide/polyurethane foam was placed in quiescent water in a flask at room temperature. The piece slowly settled in the water until it just floated. After 1 week, only a few red particles had separated and sunk to the bottom of the flask. The bulk of the foam sample remained afloat.

7B. In Test B, the procedure of Test A was followed except the water and several 1 cm pieces of ferric oxide/polyurethane composite were placed in a 4 oz narrow-necked bottle which was sealed and placed on turning rolls to rotate for one week at room temperature. Only a few small particles separated and about two-thirds of those sank. This showed that, in agitated water, the porous composite slowly releases small ferric oxide particles which will provide bioavailable iron for photosynthesis.

7C. In Test C, part of the original ferric oxide/polyurethane foam ground to powder in a food blender, and the powder was placed in water. Initially, most of the powder particles floated, but after 3 hours, smaller particles had sunk. After 1 week, about ⅔ of the particles had sunk.

EXAMPLE 8

In this Example, a buoyant iron-containing polyurethane foam was prepared as in Example 7, except that the ferric oxide was replaced with ferric chloride ($FeCl_2.4H_2O$; 1 g). After the ingredients were mixed together, a very dense foam developed slowly overnight. The foam floated on water and iron ions were slowly leached into the water. After 4 days, the foam remained floating and was yellow in color, indicating the continuing presence of iron in the foam. The foam should be divided into particles prior to use.

EXAMPLE 9

This example illustrates preparation and use of a buoyant polyurethane foam composition containing ferric phosphate to stimulate photosynthetic growth in iron-deficient seawater and fresh water.

A 0.5 M solution of trisodium phosphate ($Na_3PO_4$) was prepared by dissolving 13.4 g (0.05 mole) of disodium hydrogen phosphate ($Na_2HPO_4.7H_2O$) in 70 ml of water, then adding 2.0 g (0.05 mole) of sodium hydroxide to the solution, followed by dilution to 100 ml with water.

Forty ml of the trisodium phosphate solution were mixed with 40 ml of a 0.5 M aqueous solution of ferric chloride. The mixture was shaken and the precipitated ferric phosphate was filtered off, washed with water, methanol and finally methylene chloride. Yield: 2.86 g (92%) of $FePO_4$ as a pale yellow powder.

Ferric phosphate powder (1.5 g) was mixed with 3.2 g of the glycerin/resin component B of INSTAPAK™ polyurethane foam 40W (from Complete Packaging, Inc.) in a mortar and ground to a paste. Three g of the isocyanate component C of the foam ingredients were added to the mortar and mixed quickly with a pestle. After 3 min, a dry open pore, pale yellow foam occupying about 150 ml had formed. The foam (31-F) weighed 7.5 g and was found to contain about 20% $FePO_4$.

One g of 31-F was chopped in a blendor, then stirred with deionized water for 1 day. The foam was filtered off, then resuspended in water and allowed to stand for 5 cays with occasional stirring. A small amount of solid matter settled out. The floating material was carefully removed and stored moist (31-W) until tested as a micronutrient source.

Water buoyant foam compositions 31-F and 31-W were tested as micronutrient sources for photosynthetic growth in both artificial seawater and BG-11 water media, according to the general procedure described above. Results are given in Table 1 for Synechocystis growth in BG-11 and in Table 2 for Dunaliella in artificial seawater. The results show that with both photosynthetic organisms, cells in the iron-depleted media grew more slowly than those in iron-supplemented media. After 3 days, cell density was about 5 fold higher for Synechocystis in BG-11 containing the foam compositions 31-F and 31-W as compared with Synechocystis in BG-11 containing no iron supplement. After 3 days, cell density was about 4 fold higher for Dunaliella in artficial seawater containing the foam compositions 31-F and 31-W as compared with Dunaliella in artificial seawater containing no iron supplement. Where iron-depleted media was seeded with 31-F and 31-W, the cell growth accelerated to the point where it approximated that of the normal, iron-supplemented media, i.e., after 3 days of growth, the cell density was 3–4 fold higher than the iron-depleted control.

EXAMPLE 10

Particulates of polystyrene foam (1.2 g) were placed in a glass dish and 10 wt % aqueous ferric chloride solution was added in small amounts until the foam particles were wet. The dish was loosely covered with aluminum foil and dried at 90° C. for 3 days. The dried foam composition contained 2.0 g of iron compound, believed to be largely ferric oxychloride.

The particulate foam composition was suspended in water for 1 day, filtered, washed with water, then soaked in fresh water for 5 days. The floating material was collected and dried. The particles varied in color from off-white (large particles) to tan (smaller particles, 32-A).

Composition 32-A was tested as a micronutrient source for photosynthetic growth in both seawater and fresh water media, according to the general procedure described above. Results are given in Table 1 for Synechocysis growth in BG-11 and in Table 2 for Dunaliella in artificial seawater. The results show that with both photosynthetic organisms, cells in the iron-supplemented media grew more rapidly than those in iron-depleted media. After 3 days, cell density was 4–5 fold higher in the presence of foam composition 32-A than in iron-depleted media, as in Example 9.

EXAMPLE 11

Hollow glass spheres (PQ Extendospheres™, from fly ash) were impregnated with ferric oxychloride by mixing 5 g of the spheres, 1 g of ferric chloride and 10 ml of water. The mix was heated to 140° C. in air in an oven for 1 h, then cooled. Water (200 ml) was added and the suspension was allowed to stand overnight. A top layer was decanted off. The remainder was filtered, suspended in water for 2 h, filtered and dried. The recovered product weighed 4 g The product (36) passed a 60 mesh screen. Under a microscope the spheres were all coated with a red deposit; some conglomerates of 2 or 3 spheres were present.

Composition 36 was tested as a water buoyant micronutrient source along with the products of Examples 9 and 10 for photosynthetic grow in both seawater and fresh water media, according to the general procedure described above. Results are given in Table 1 for Synechocystis growth in BG-11 and in Table 2 for Dunaliella in artificial seawater. The results show that with both photosynthetic organisms, cells in the iron-supplemented media grew more rapidly than those in iron-depleted media After 3 days, cell density was 4–5 fold higher in the presence of foam composition 32-A than in iron-depleted media, as in Examples 9 and 10.

TABLE 1

Synechocystis PCC6803 Growth in BG-11 Media

| | | Optical Density (730 nm) | | | |
|---|---|---|---|---|---|
| Sample | Description | 0 h | 21.25 h | 46.67 h | 73.5 h |
| 0 | E | 0.104 | 0.21 | 0.34 | 0.45 |
| 1 | E + 0.1 mg of 31-W | 0.104 | 0.22 | 0.35 | 0.53 |
| 2 | E + 0.1 mg of 3l-F | 0.103 | 0.22 | 0.33 | 0.58 |
| 3 | E + 0.1 mg of 32-A | 0.105 | 0.21 | 0.42 | 0.82 |
| 4 | E + 0.1 mg of 36 | 0.106 | 0.23 | 0.66 | 1.25 |
| 5 | E + 1.0 mg of 3l-W | 0.104 | 0.21 | 0.33 | 0.56 |
| 6 | E + 1.0 mg of 3l-F | 0.106 | 0.31 | 0.59 | 1.88 |
| 7 | E + 1.0 mg of 32-A | 0.105 | 0.26 | 0.61 | 1.49 |
| 8 | E + 1.0 mg of 36 | 0.105 | 0.33 | 1.01 | 2.05 |
| 9 | G | 0.107 | 0.40 | 1.18 | 2.54 |
| 10 | G + 0.1 mg of 3l-W | 0.109 | 0.39 | 1.20 | 2.63 |
| 11 | G + 0.1 mg of 3l-F | 0.107 | 0.41 | 1.11 | 2.41 |
| 12 | G + 0.1 mg of 32-A | 0.108 | 0.41 | 1.07 | 2.39 |
| 13 | G + 0.1 mg of 36 | 0.109 | 0.39 | 1.16 | 2.51 |
| 14 | G + 1.0 mg of 3l-W | 0.107 | 0.42 | 0.1.11 | 2.39 |
| 15 | G + 1.0 mg of 3l-F | 0.110 | 0.41 | 1.13 | 2.47 |
| 16 | G + 1.0 mg of 32-A | 0.110 | 0.40 | 0.98 | 2.48 |
| 17 | G + 1.0 mg of 36 | 0.111 | 0.41 | 1.18 | 2.80 |
| 18 | H | 0.112 | 0.61 | 1.44 | 2.94 |

E = Cells grown in the absence of Fe and inoculated into medium devoid of Fe;
G = Cells grown in the absence of Fe but inoculated into normal, Fe-containing medium;
H = Cells grown in the presence of normal amounts of Fe and inoculated into normal, Fe-containing medium.

TABLE 2

*Dunaliella teritolecta* Growth in Artificial Seawater

| | | Optical Density (730 nm) | | | |
|---|---|---|---|---|---|
| Sample | Description | 0 h | 21.25 h | 46.67 h | 73.5 h |
| 0 | E | 0.125 | 0.216 | 0.285 | 0.340 |
| 1 | E + 0.1 mg of 3l-W | 0.114 | 0.247 | 0.725 | 1.05 |
| 2 | E + 0.1 mg of 3l-F | 0.118 | 0.243 | 0.616 | 1.12 |
| 3 | E + 0.1 mg of 32-A | 0.118 | 0.228 | 0.402 | 0.62 |
| 4 | E + 0.1 mg of 36 | 0.121 | 0.270 | 0.616 | 1.09 |
| 5 | E + 1.0 mg of 3l-W | 0.111 | 0.234 | 0.558 | 1.10 |
| 6 | E + 1.0 mg of 3l-F | 0.122 | 0.206 | 0.60 | 1.14 |
| 7 | E + 1.0 mg of 32-A | 0.116 | 0.202 | 0.484 | 0.975 |
| 8 | E + 1.0 mg of 36 | 0.116 | 0.232 | 0.436 | 1.10 |
| 9 | G | 0.128 | 0.254 | 0.636 | 1.38 |
| 10 | G + 0.1 mg of 3l-W | 0.093 | 0.238 | 0.628 | 1.2 |
| 11 | G + 0.1 mg of 3l-F | 0.117 | 0.240 | 0.605 | 1.2 |
| 12 | G + 0.1 mg of 32-A | 0.112 | 0.234 | 0.60 | 1.2 |
| 13 | G + 0.1 mg of 36 | 0.122 | 0.277 | 0.508 | 1.0 |
| 14 | G + 1.0 mg of 3l-W | 0.10 | 0.178 | 0.432 | 0.935 |
| 15 | G + 1.0 mg of 3l-F | 0.116 | 0.116 | 0.314 | 0.86 |
| 16 | G + 1.0 mg of 32-A | 0.107 | 0.164 | 0.374 | 0795 |

TABLE 2-continued

*Dunaliella teritolecta* Growth in Artificial Seawater

| | | Optical Density (730 nm) | | | |
|---|---|---|---|---|---|
| Sample | Description | 0 h | 21.25 h | 46.67 h | 73.5 h |
| 17 | G + 1.0 mg of 36 | 0.113 | 0.234 | 0.574 | 1.14 |
| 18 | H | 0.089 | 0.245 | 0.632 | 1.2 |

E = Cells grown in the absence of Fe and inoculated into medium devoid of Fe;
G = Cells grown in the absence of Fe but inoculated into normal Fe-containing medium;
H = Cells grown in the presence of normal amounts of Fe and inoculated into normal Fe-containing medium.

What is claims is:

1. A composition comprising water-buoyant particles comprising from about 0.01% to 90% by weight of elemental micronutrient for photosynthetic phytoplankton growth, said particles having an average length in the range of about 0.001 mm to 100 mm, provided that when the average length is greater than 10 mm, the average largest cross-sectional length perpendicular to the length cannot be more than 10% of the average length.

2. The composition of claim 1 wherein the elemental micronutrient is selected from the group consisting of Fe, Co, Mn, Zn, and mixtures thereof.

3. The composition of claim 1 further comprising a water-buoyant, chemically-inert, relatively water-insoluble particulate substrate material that supports a source of micronutrient.

4. The composition of claim 2 wherein the elemental micronutrient is iron.

5. The composition of claim 3 wherein the composition comprises a substrate of water-buoyant, particles made of a polymeric foam, hollow glass, or cellulose.

6. The composition of claim 5 wherein the polymer comprising said polymeric foam is selected from the group consisting of polystyrene, polyurethane, polyester, polyvinyl alcohol, poly(lactide), and urea—formaldehyde.

7. The composition of claim 5 wherein the hollow glass particles are derived from fly-ash.

8. The composition of claim 3 further comprising at least one water-soluble agent for effecting or promoting adhesion of the source of micronutrient to the substrate and for slowing its release of the source of micronutrient into a surrounding body of water during use.

9. The composition of claim 8 wherein the water soluble agent for promoting adhesion of the source of micronutrient to the substrate is selected from the group consisting of poly(vinyl alcohol), poly(acrylic acid), poly(methacrylic acid), methyl cellulose, poly(N-vinyl pyrrolidone), poly(acryl amide), poly(methacryl amide), poly(ethylene oxide), gelatin, natural gum, and sodium polysilicate.

10. The composition of claim 2 containing at least about 1% of elemental micronutrient.

11. The composition of claim 10 wherein the elemental micronutrient is iron.

12. The composition of claim 11 wherein the source of micronutrient is selected from the group consisting of elemental iron, ferrous sulfate, ferrous ammonium sulfate, ferrous chloride, ferric chloride, ferric nitrate, ferrous nitrate, oxides of iron, mixed metal oxides comprising iron, hydroxides of iron, iron suboxides, oxyhalides, and mixtures thereof.

13. The composition of claim 2 or 3 in dry particulate form.

14. The composition of claim 2 or 3 in the form of an aqueous dispersion.

15. The composition of claim 13 in an amount of at least one metric ton.

16. A process for preparing an aqueous dispersion of a composition comprising water-buoyant particles containing about 0.1% to 90% by weight of a micronutrient for photosynthetic phytoplankton growth selected from the group consisting of Fe, Co, Mn, Zn, and mixtures thereof, said particles having an average length in the range of about 0.001 mm to 100 mm, provided that when the average length is greater than 10 mm, the average largest cross-sectional length perpendicular to the length cannot be more than 10% of the average length, which process comprises admixing and impregnating a water-buoyant, relatively water insoluble particulate substrate material with an aqueous solution or dispersion of one or more compounds that are a source of the micronutrient.

17. The process of claim 16 further comprising drying the aqueous dispersion of the composition to provide free-flowing particles.

18. The process of claim 17 wherein the micronutrient-source-containing solution or dispersion also contains one or more water-soluble agents that promote durable adhesion of the micronutrient-source compound to the substrate.

19. The process of claim 17 further comprising application of one or more water-soluble agents that promote durable adhesion of the micronutrient source compound to the substrate.

20. A process for stimulating photosynthetic phytoplankton growth in a ocean, lake, or river devoid of, or deficient in, such growth, said process comprising supplying iron to the surface of said ocean, lake, or river areas by deploying water-buoyant particles containing about 0.01% to 90% by weight of iron on said ocean, lake, or river surface, said particles having an average length in the range of about 0.001 mm to 100 mm, provided that when the average length is greater than 10 mm, the average largest cross-sectional length perpendicular to the length cannot be more than 10% of the average length.

21. The process of claim 20, wherein said process is performed in an ocean.

22. The Process of claim 20 wherein global carbon dioxide is reduced by the iron-stimulated generation of oceanic photosynthetic phytoplankton.

23. The process of claim 20 wherein marine or freshwater food is increased by the iron-stimulated generation of photosynthetic phytoplankton.

24. A process for preparing a particulate, water-buoyant composition containing about 0.01% to 90% by weight of a micronutrient for photosynthetic phytoplankton growth selected from the group consisting of Fe, Co, Mn, Zn, and mixtures thereof, which process comprises the following steps:

(a) obtaining particles of an insoluble micronutrient source in an aqueous media containing a soluble sealing agent by either (i) admixing particles of an insoluble micronutrient source in an aqueous media containing a soluble sealing agent, or (ii) precipitating a soluble micronutrient source from an aqueous media containing a soluble sealing agent; and (b) drying the mixture from (a) and, if step (a)(i) was previously carried out, then in addition fusing the particles at a temperature of at least about 1000° C., thereby forming free-flowing, water-buoyant particles coated with said sealing agent for temporarily sealing the surfaces of the particles.

25. The process of claim 24, wherein the micronutrient source is elemental iron or a compound thereof.

26. The process of claim 24, wherein the soluble micronutrient source in step (a) is precipitated by adding a base or alkali.

27. The composition of claim 12 wherein the source of micronutrient is a mixed metal oxide containing iron selected from the group consisting of iron phosphates, iron silicates, iron aluminates, iron aluminosilicates, and iron titanates.

28. The composition of claim 14 in an amount of at least one metric ton.

* * * * *